US009219290B2

(12) United States Patent
Kitaura

(10) Patent No.: US 9,219,290 B2
(45) Date of Patent: Dec. 22, 2015

(54) BATTERY AND METHOD FOR PRODUCING THE SAME

(75) Inventor: Masaaki Kitaura, Fukushima (JP)

(73) Assignee: SONY CORPORATION, Tokyo (JP)

( * ) Notice: Subject to any disclaimer, the term of this patent is extended or adjusted under 35 U.S.C. 154(b) by 541 days.

(21) Appl. No.: 13/191,903

(22) Filed: Jul. 27, 2011

(65) Prior Publication Data

US 2012/0034510 A1    Feb. 9, 2012

(30) Foreign Application Priority Data

Aug. 6, 2010    (JP) ................. 2010-177825

(51) Int. Cl.
| H01M 2/02 | (2006.01) |
| H01M 10/04 | (2006.01) |
| H01M 2/36 | (2006.01) |
| B65B 31/02 | (2006.01) |
| H01M 10/0565 | (2010.01) |
| H01M 10/0585 | (2010.01) |
| H01M 10/0587 | (2010.01) |

(52) U.S. Cl.
CPC ........ *H01M 10/0431* (2013.01); *H01M 2/0285* (2013.01); *H01M 10/0565* (2013.01); *H01M 10/0585* (2013.01); *H01M 10/0587* (2013.01); *H01M 2/0287* (2013.01); *Y10T 29/4911* (2015.01)

(58) Field of Classification Search
CPC ..................... H01M 10/0431; H01M 10/0585; H01M 10/0565; H01M 10/0587; H01M 2/0285; H01M 2/0287

USPC ......................................... 429/163; 29/623.2
See application file for complete search history.

(56) References Cited

U.S. PATENT DOCUMENTS

| 6,051,340 A * | 4/2000 | Kawakami et al. ...... 429/231.95 |
| 6,371,996 B1 * | 4/2002 | Takayama et al. ........... 29/623.2 |
| 2007/0072071 A1 * | 3/2007 | Lee ............................... 429/162 |

FOREIGN PATENT DOCUMENTS

| JP | 2000-285885 | 10/2000 |
| JP | 2000-311661 | 11/2000 |
| JP | 2002-298833 | 10/2002 |
| JP | 2003-223926 | 8/2003 |
| JP | 2005-093261 | 4/2005 |
| JP | 2009-076248 | 4/2009 |

(Continued)

OTHER PUBLICATIONS

Japanese Patent Office, Office action issued in connection with Japanese Patent Application No. 2010-177825, dated Nov. 26, 2013. (4 pages).

(Continued)

*Primary Examiner* — Karie O'Neill Apicella
(74) *Attorney, Agent, or Firm* — Hazuki International, LLC

(57) ABSTRACT

A method for producing a battery includes forming a space by expanding a liquid housing portion, the liquid housing portion being present at one end of an outer package that houses a battery element, through supply of gas from an opening portion formed at the other end of the outer package; injecting an electrolytic solution from the opening portion to store the electrolytic solution in the space of the liquid housing portion; degassing the outer package through the opening portion in a vacuum state; sealing the opening portion; and impregnating the electrolytic solution into the battery element.

12 Claims, 12 Drawing Sheets

(56) References Cited

FOREIGN PATENT DOCUMENTS

| | | | | |
|---|---|---|---|---|
| JP | 2009076248 A | * | 4/2009 | ............ H01M 10/36 |
| JP | 2010-177825 | | 11/2010 | |

OTHER PUBLICATIONS

Chinese Office Action issued Sep. 30, 2014, for corresponding Chinese Appln. No. 2011102008358.

* cited by examiner

BATTERY AND METHOD FOR PRODUCING THE SAME

CROSS REFERENCES TO RELATED APPLICATIONS

The present application claims priority to Japanese Priority Patent Application JP 2010-177825 filed in the Japan Patent Office on Aug. 6, 2010, the entire contents of which are hereby incorporated by reference.

BACKGROUND

The present application relates to a battery and a method for producing the same. Specifically, the present application relates to a battery in which a battery element is sealed with an outer package.

Battery packs that use a laminate film or the like as an outer package have been widely used because they are lightweight and have high energy density. Such battery packs are produced by housing, in an outer package, a battery element including a positive electrode, a negative electrode, and a separator, injecting an electrolytic solution into the outer package, and injecting and impregnating the electrolytic solution into the battery element.

For example, the following method is disclosed as a method for producing a battery pack, the method including such an injection and impregnation step (refer to Japanese Unexamined Patent Application Publication No. 2000-311661).

First, a battery element is housed in an outer package including an opening portion whose shape and size are larger than necessary. The outer package that is housing the battery element is then disposed in a vacuum chamber so that the opening portion faces upward. Subsequently, an electrolytic solution is injected into the opening portion of the outer package under reduced pressure, and then the pressure in the vacuum chamber is returned to atmospheric pressure. Thus, the electrolytic solution injected into the opening portion of the outer package is injected and impregnated into the battery element through a space above the battery element, the space serving as a temporary pool. The outer package that is housing the battery element is then taken out of the vacuum chamber. A region that is on the opening portion side of the outer package and adjacent to the battery element is heat-sealed. An unnecessary portion of the opening portion of the outer package is cut out while the heat-sealed region is left.

SUMMARY

However, in the above-described method for producing a battery pack, the following problems arise because, as shown in FIG. 1A, vacuuming is performed while an electrolytic solution 104 is stored in an opening portion 103 located above a battery element 101. As shown in FIG. 1B, the electrolytic solution 104 is forced up by air that comes from the battery element 101 or its housing space 105 located below the electrolytic solution 104 and is thus scattered. As a result, the amount of the electrolytic solution 104 is significantly decreased and it becomes difficult to produce the battery pack. Furthermore, the presence of the electrolytic solution 104 above the battery element 101 decreases the degassing efficiency of the battery element 101 and its housing space 105.

Accordingly, it is desirable to provide a battery in which a decrease in the amount of electrolytic solution can be suppressed in an injection and impregnation step and an outer package can be efficiently degassed, and a method for producing the battery.

According to an embodiment, there is provided a method for producing a battery including forming a space by expanding a liquid housing portion, the liquid housing portion being present at one end of an outer package that houses a battery element, through supply of gas from an opening portion formed at the other end of the outer package; injecting an electrolytic solution from the opening portion to store the electrolytic solution in the space of the liquid housing portion; degassing the outer package through the opening portion in a vacuum state; sealing the opening portion; and impregnating the electrolytic solution into the battery element.

According to another embodiment, there is provided a method for producing a battery including forming a space by expanding a liquid housing portion, the liquid housing portion being present at one end of an outer package that houses a battery element, through supply of gas from an opening portion formed at the other end of the outer package; injecting an electrolyte composition from the opening portion to store the electrolyte composition in the space of the liquid housing portion; degassing the outer package through the opening portion in a vacuum state; sealing the opening portion; impregnating the electrolyte composition into the battery element; and gelatinizing the electrolyte composition impregnated into the battery element.

According to still another embodiment, there is provided a battery including a battery element containing an electrolytic solution and an outer package that seals and houses the battery element, wherein the battery element is obtained by forming a space by expanding a liquid housing portion, the liquid housing portion being present at one end of the outer package, through supply of gas from an opening portion formed at the other end of the outer package; injecting an electrolytic solution from the opening portion to store the electrolytic solution in the space of the liquid housing portion; degassing the outer package through the opening portion in a vacuum state; sealing the opening portion; and impregnating the electrolytic solution into the battery element.

According to still yet another embodiment, there is provided a battery including a battery element containing a gel electrolyte and an outer package that seals and houses the battery element, wherein the battery element is obtained by forming a space by expanding a liquid housing portion, the liquid housing portion being present at one end of the outer package, through supply of gas from an opening portion formed at the other end of the outer package; injecting an electrolyte composition from the opening portion to store the electrolyte composition in the space of the liquid housing portion; degassing the outer package through the opening portion in a vacuum state; sealing the opening portion; impregnating the electrolyte composition into the battery element; and gelatinizing the electrolyte composition impregnated into the battery element.

In the present application, an electrolytic solution or an electrolyte composition is stored in a space of a liquid housing portion formed on one end of an outer package and the outer package is degassed through an opening portion formed at the other end of the outer package. Therefore, in the degassing step, the scattering of the electrolytic solution or electrolyte composition through the opening portion can be suppressed. Furthermore, since the electrolytic solution or electrolyte composition that inhibits the degassing of the outer package is not present in the opening portion, the degassing efficiency of the outer package can be improved.

As described above, according to the present application, since the scattering of the electrolytic solution or electrolyte composition through the opening portion in the degassing step can be suppressed, a decrease in the amount of electrolytic solution or electrolyte composition in the degassing step can be suppressed. Furthermore, since the degassing efficiency of the outer package can be improved, the thickness of the battery can be decreased. The swelling of the battery during high temperature storage can also be suppressed.

Additional features and advantages are described herein, and will be apparent from the following Detailed Description and the figures.

DETAILED DESCRIPTION

Embodiments of the present application will be described below in detail with reference to the drawings.

1. First embodiment (an example in which an underpocket portion is formed on the side of an element housing portion)

2. Second embodiment (an example in which an underpocket portion is formed on the bottom of an element housing portion)

1. First Embodiment

Configuration of Battery Pack

Figure 1A:
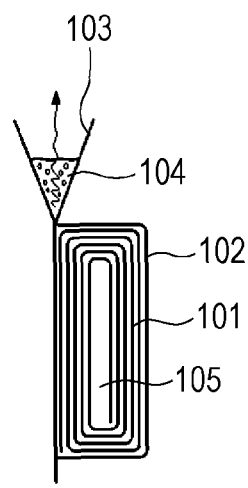
FIGS. 1A and 1B are sectional views for describing the production process of commonly used battery packs.
Figure 1B:
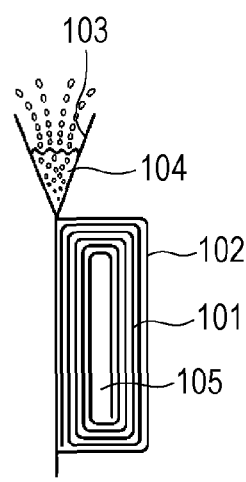
Figure 2:
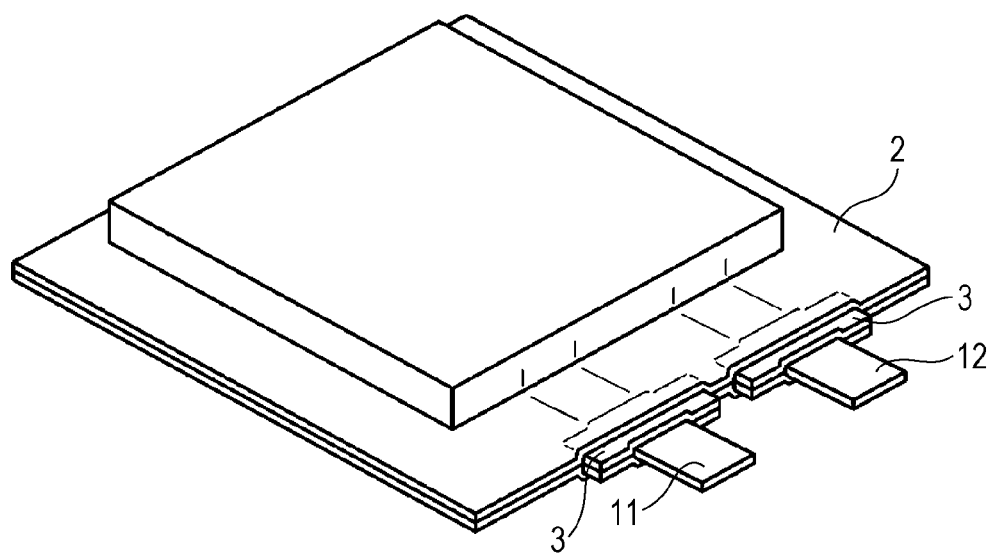
FIG. 2 is a perspective view showing an exemplary appearance of a battery pack according to a first embodiment.
Figure 3:
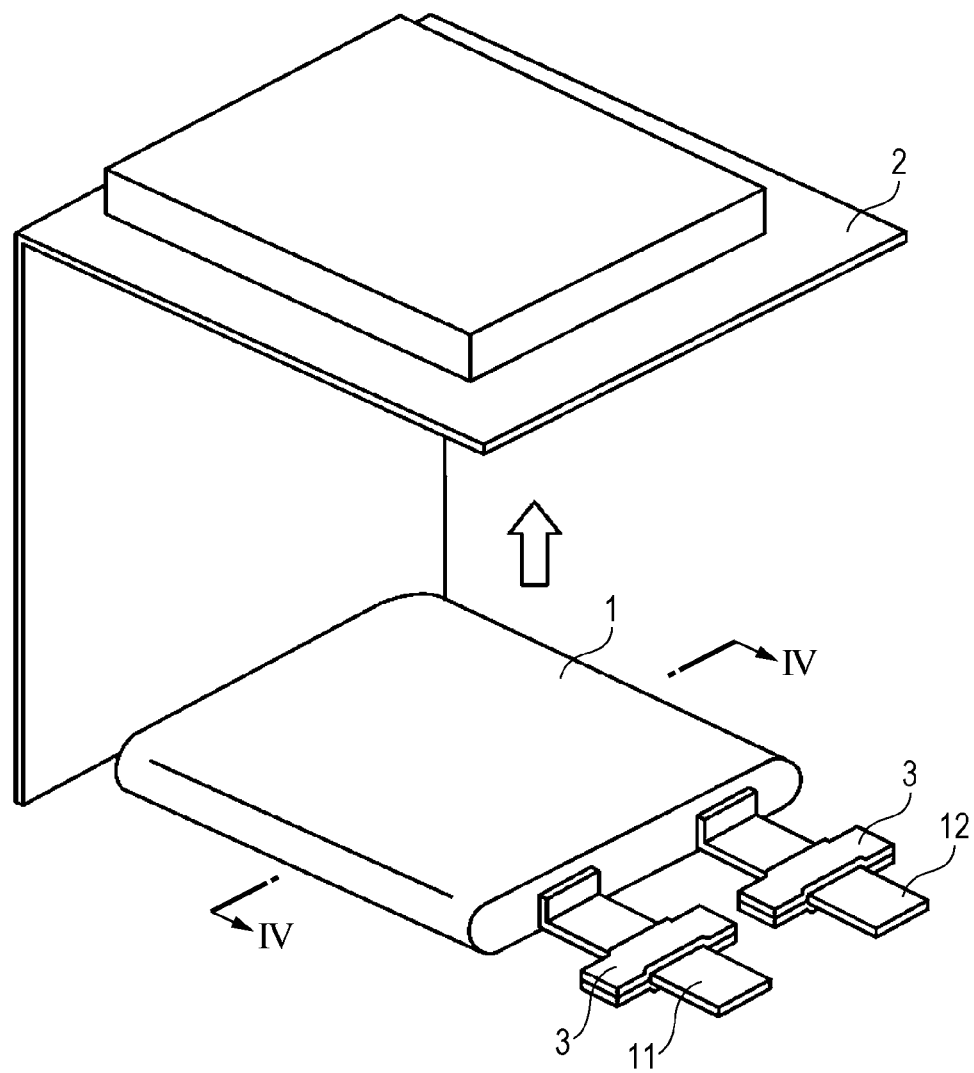
FIG. 3 is an exploded perspective view showing an exemplary configuration of the battery pack according to the first embodiment.

FIG. 2 is a perspective view showing an exemplary appearance of a battery pack according to a first. FIG. 3 is an exploded perspective view showing an exemplary configuration of the battery pack according to the first. This battery pack is obtained by housing, in a film-like outer package 2, a battery element 1 to which a positive electrode lead 11 and a negative electrode lead 12 has been attached, and reductions in size, weight, and thickness can be achieved. In this specification, a battery (packed battery) including the battery element 1 packed with the outer package 2 is referred to as a battery pack. Hereinafter, the end face of the battery element 1 from which the positive electrode lead 11 and the negative electrode lead 12 are drawn out is referred to as a top, and the end face opposite the top is referred to as a bottom. The side portion located between the top and the bottom is referred to as a side.

The positive electrode lead 11 and the negative electrode lead 12 each extend in the direction from the inside to outside of the outer package 2. For example, they are drawn out in the same direction. The positive electrode lead 11 and the negative electrode lead 12 are each composed of a metal material such as aluminum, copper, nickel, or stainless steel and each have a thin plate shape or a mesh shape.

The outer package 2 is composed of, for example, a flexible film. The outer package 2 has a structure obtained by sequentially stacking, for example, a heat-sealing resin layer, a metal layer, and a surface protection layer. The surface on the heat-sealing resin layer side is a surface on the side on which the battery element 1 is housed. Examples of the material of the heat-sealing resin layer include polypropylene (PP) and polyethylene (PE). An example of the material of the metal layer is aluminum (Al). An example of the material of the surface protection layer is nylon (Ny). Specifically, the outer package 2 is formed of a rectangular aluminum laminate film obtained by laminating, for example, a nylon film, an aluminum foil, and a polyethylene film in that order. The outer package 2 is disposed so that the polyethylene film faces the battery element 1, and the peripheries of the polyethylene film and the battery element 1 are brought into intimate contact with each other by heat sealing or using an adhesive. An adhesive film 3 for preventing the entry of the outside air is inserted between the outer package 2 and the positive electrode lead 11 and between the outer package 2 and the negative electrode lead 12. The adhesive film 3 is composed of a material that adheres to the positive electrode lead 11 and the negative electrode lead 12. Examples of the material include polyolefin resins such as polyethylene, polypropylene, modified polyethylene, and modified polypropylene.

The outer package 2 may be formed of a laminate film having another structure, a polymer film composed of polypropylene or the like, or a metal film, instead of the above-described aluminum laminate film.

Figure 4:
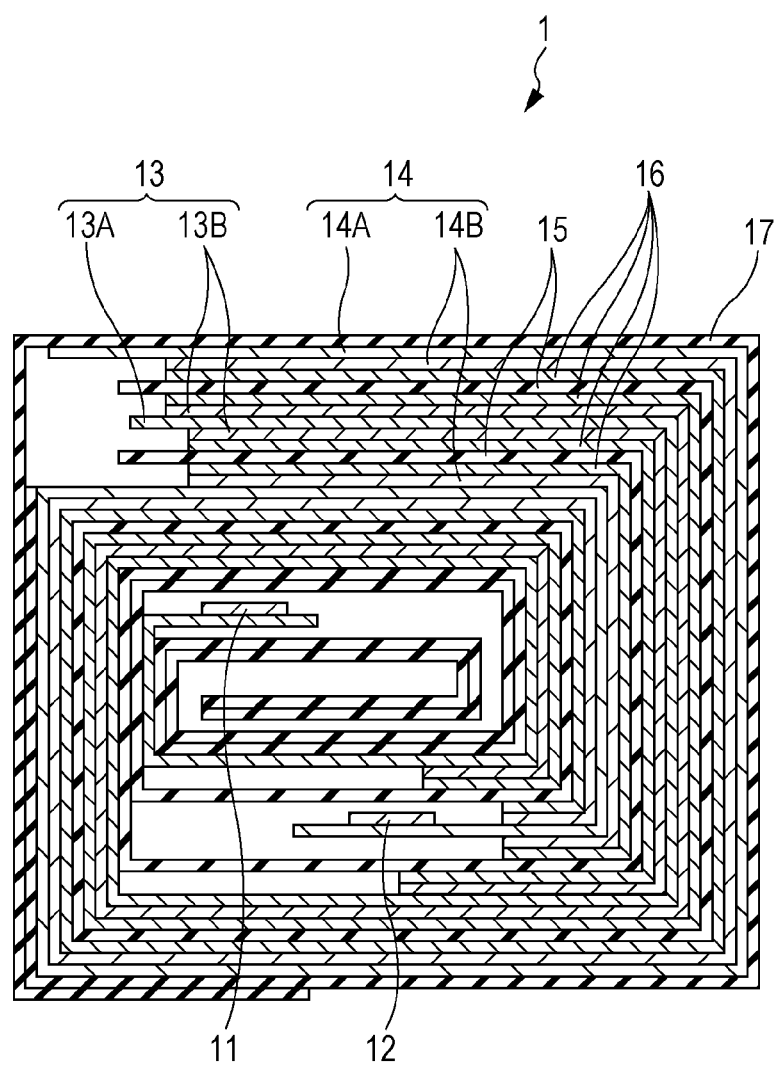
FIG. 4 is a sectional view taken along line IV-IV of the battery element shown in FIG. 3.

FIG. 4 is a sectional view taken along line Iv-Iv of the battery element shown in FIG. 3. The battery element 1 is obtained by stacking a positive electrode 13 and a negative electrode 14 with a separator 15 and an electrolyte layer 16 therebetween and then winding them. The outermost periphery of the wound body is protected by a protective tape 17. The positive electrode 13, the negative electrode lead 14, the separator 15, and the electrolyte layer 16 that constitute the battery element 1 will now be described one by one with reference to FIG. 4.

(Positive Electrode) p The positive electrode 13 has a structure in which a positive electrode active material layer 13B is formed on both faces of a positive electrode current collector 13A. Although not shown, the positive electrode active material layer 13B may be formed on only one face of the positive electrode current collector 13A. The positive electrode current collector 13A is composed of a metal foil such as an aluminum foil. The positive electrode active material layer 13B contains, as a positive electrode active material, at least one positive electrode material that can occlude and release lithium, and may optionally contain a conductive agent such as graphite and a binding agent such as polyvinylidene fluoride.

Examples of the positive electrode material that can occlude and release lithium include lithium oxide, lithium phosphate, lithium sulfide, and lithium-containing compounds such as intercalation compounds containing lithium. These positive electrode materials may be used in combination. To increase the energy density, lithium-containing compounds that contain lithium, a transition metal element, and oxygen (O) are preferred. Among them, lithium-containing compounds that contain, as a transition metal element, at least one selected from the group of cobalt (Co), nickel (Ni), manganese (Mn), and iron (Fe) are more preferred. Examples of the lithium-containing compounds include lithium composite oxides having a layered rock salt structure, for example, represented by formulae (1), (2), and (3), lithium composite oxides having a spinel structure represented by formula (4), and lithium composite phosphate having an olivine structure represented by formula (5). Specific examples of the lithium-containing compounds include $LiNi_{0.50}Co_{0.20}Mn_{0.30}O_2$, $Li_aCoO_2$ (a≅1), $Li_bNiO_2$ (b≅1), $Li_{c1}Ni_{c2}Co_{1-c2}O_2$ (c1≅1, 0<c2<1), $Li_dMn_2O_4$ (d≅1), and $Li_eFePO_4$ (e≅1).

$$Li_jMn_{(1-g-h)}Ni_gM1_hO_{(2-j)}F_k \quad (1)$$

where M1 is at least one selected from the group of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); and f, g, h, j, and k satisfy 0.8≤f≤1.2, 0<g<0.5, 0≤h≤0.5, g+h<1, −0.1≤j≤0.2, and 0≤k≤0.1. The composition of lithium depends on the charge-discharge state, and f is a value at full discharge.

$$Li_mNi_{(1-n)}M2_nO_{(2-p)}F_q \quad (2)$$

where M2 is at least one selected from the group of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and m, n, p, and q satisfy 0.8≤m≤1.2, 0.005≤n≤0.5, −0.1≤p≤0.2, and 0≤q≤0.1. The composition of lithium depends on the charge-discharge state, and m is a value at full discharge.

$$Li_rCo_{(1-s)}M3_sO_{(2-t)}F_u \quad (3)$$

where M3 is at least one selected from the group of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and r, s, t, and u satisfy 0.8≤r≤1.2, 0 s<0.5, −0.1≤t≤0.2, and 0≤u≤0.1. The composition of lithium depends on the charge-discharge state, and r is a value at full discharge.

$$Li_vMn_{2-w}M4wOxFy \quad (4)$$

where M4 is at least one selected from the group of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and v, w, x, and y satisfy 0.9≤v≤1.1, 0≤w≤0.6, 3.7≤x≤4.1, and 0≤y≤0.1. The composition of lithium depends on the charge-discharge state, and v is a value at full discharge.

$$Li_zM5PO_4 \quad (5)$$

where M5 is at least one selected from the group of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr); and z satisfies 0.9≤z≤1.1. The composition of lithium depends on the charge-discharge state, and z is a value at full discharge.

Other examples of the positive electrode material that can occlude and release lithium include inorganic compounds that do not contain lithium, such as $MnO2$, $V2O5$, $V6O13$, NiS, and MoS.

(Negative Electrode)

The negative electrode 14 has a structure in which a negative electrode active material layer 14B is formed on both faces of a negative electrode current collector 14A. Although not shown, the negative electrode active material layer 14B may be formed on only one face of the negative electrode current collector 14A. The negative electrode current collector 14A is composed of a metal foil such as a copper foil.

The negative electrode active material layer 14B contains, as a negative electrode active material, at least one negative electrode material that can occlude and release lithium, and may optionally contain a binding agent similar to that contained in the positive electrode active material layer 13B.

In this battery element 1, which is a secondary battery, the electrochemical equivalent of the negative electrode material that can occlude and release lithium is larger than that of the positive electrode 13, whereby lithium is not deposited on the negative electrode 14 during charging.

Examples of the negative electrode material that can occlude and release lithium include carbon materials such as non-graphitizable carbon, graphitizable carbon, graphite, pyrolytic carbon, coke, glassy carbon, organic polymer compound fired bodies, carbon fiber, and activated carbon. The coke includes pitch coke, needle coke, and petroleum coke. The organic polymer compound fired bodies are carbonized materials obtained by firing a polymer material such as a phenol resin or a furan resin at an appropriate temperature. Some of the organic polymer compound fired bodies are classified into non-graphitizable carbon or graphitizable carbon. Examples of the polymer material include polyacetylene and polypyrrole. These carbon materials are preferably used because the crystal structure hardly varies during charging and discharging and thus high charge-discharge capacity and good cycle characteristics can be achieved. In particular, graphite is preferably used because it has a large electrochemical equivalent and thus high energy density can be achieved. Furthermore, non-graphitizable carbon is preferably used because good characteristics are achieved. In addition, a material having a low charge-discharge potential, for example, a material having a charge-discharge potential close to that of lithium is preferably used because high energy density of batteries can be easily achieved.

A material that contains, as a constituent element, at least one of metalloid elements and metal elements and can occlude and release lithium is also used as the negative electrode material that can occlude and release lithium. With such a material, high energy density can be achieved. In particular, such a material is more preferably used together with the carbon material because high energy density and good cycle characteristics can be achieved. The negative electrode material may be composed of a metal element or a metalloid element in the form of a simple substance, an alloy, or a compound or may have one or more phases of the metal element or the metalloid element in at least part of the negative electrode material. In the present application, the term "alloy" refers to not only an alloy containing two or more metal elements but also an alloy containing one or more metal elements and one or more metalloid elements. Such an alloy may further contain a nonmetal element. Such an alloy has a structure of a solid solution, a eutectic (eutectic mixture), an intermetallic compound, or two or more of the foregoing.

Examples of the metal element and the metalloid element constituting the negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). They may be crystalline or amorphous.

Among them, a material containing, as a constituent element, a group 4B metal element or metalloid element in a short-form periodic table is preferred as the negative electrode material, and a material containing at least one of silicon (Si) and tin (Sn) as a constituent element is particularly preferred. This is because silicon (Si) and tin (Sn) have high capability of occluding and releasing lithium (Li), which can provide high energy density.

For an alloy of tin (Sn), for example, a second constituent element other than tin (Sn) is at least one selected from the group of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). For an alloy of silicon (Si), for example, a second constituent element other than silicon (Si) is at least one selected from the group of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

A compound containing, for example, oxygen (O) or carbon (C) is exemplified as a compound of tin (Sn) or a compound of silicon (Si). In addition to tin (Sn) or silicon (Si), the above-described second constituent element may be contained.

Other metal compounds and polymer materials are exemplified as the negative electrode material that can occlude and release lithium. Examples of the other metal compounds include oxides such as $MnO_2$, $V_2O_5$, and $V_6O_{13}$, sulfides such as NiS and MoS, and lithium nitrides such as $LiN_3$. Examples of the polymer materials include polyacetylene, polyaniline, and polypyrrole.

(Separator)

The separator 15 allows lithium ions to pass therethrough and separates the positive electrode 13 and the negative electrode 14 from each other to prevent a short circuit caused by contacting of the electrodes. The separator 15 can be a porous membrane made of a synthetic resin such as polytetrafluoroethylene, polypropylene, or polyethylene or a porous membrane made of ceramic. Such a porous membrane can be used in the form of a single layer or multiple layers. A porous membrane made of polyolefin is particularly preferred as the separator 15. This is because short circuits can be effectively prevented and the safety of batteries can be improved due to the shutdown effect. For the separator 15, a porous resin layer composed of polyvinylidene fluoride (PVdF), polytetrafluoroethylene (PTFE), or the like may be formed on a microporous membrane composed of polyolefin or the like.

(Electrolyte Layer)

The electrolyte layer 16 contains an electrolytic solution and a polymer compound serving as a support material that supports the electrolytic solution and is present in the state of so-called gel. The gel electrolyte layer 16 is preferably used because it can provide high ionic conductivity and prevent the leakage from batteries. Examples of the polymer compound include polyacrylonitrile, polyvinylidene fluoride, copolymers of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. In terms of electrochemical stability, polyacrylonitrile, polyvinylidene fluoride, polyhexafluoropropylene, and polyethylene oxide are particularly preferred.

Method for Producing Battery Pack

An example of a method for producing the battery pack according to the first will now be described with reference to FIGS. 5A to 7C.

(Outer Package Preparation Step)

Figure 5A:
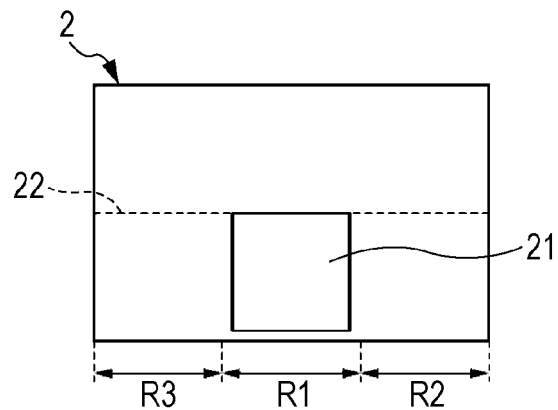
FIGS. 5A to 5D are process diagrams showing an example of a method for producing a battery pack according to the first embodiment.

First, as shown in FIG. 5A, a rectangular outer package 2 is prepared. A folding portion 22 that linearly extends so as to divide the outer package 2 into two parts is formed in advance in the central portion of the outer package 2. The folding portion 22 is, for example, a cut for easily folding back the outer package 2. The outer package 2 includes a first region R1 formed in the central portion of the outer package 2, a second region R2 formed so as to be adjacent to one side of the first region R1, and a third region R3 formed so as to be adjacent to the other side of the first region R1. The first region R1 is a region where a housing space 21 for housing a battery element 1 is formed. The second region R2 is a region where a liquid housing portion (hereinafter referred to as an underpocket portion) for housing a liquid electrolyte composition is formed. The third region R3 is a region where an opening portion is formed. Through the opening portion, an electrolyte composition is supplied to the underpocket portion and the outer package is degassed. The electrolyte composition is a precursor of the gel electrolyte layer 16.

(Housing space formation step)

Next, as shown in FIG. 5A, embossing is performed on a portion located in one of the parts into which the outer package 2 is divided by the folding portion 22, the portion being on a surface on the heat-sealing resin layer side in the first region R1. Thus, a housing space 21 for housing the battery element 1 is formed.

(Element Housing and Outer Package Folding Step)

Figure 5B:
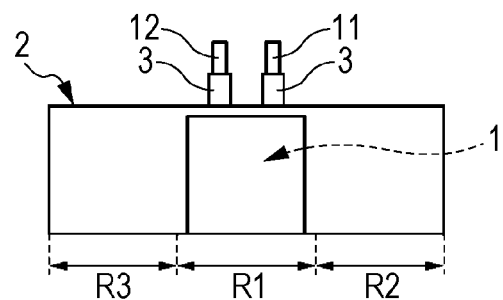

Next, as shown in FIG. 5B, the battery element 1 is housed in the housing space 21 and the outer package 2 is folded back along the folding portion 22. Two side portions facing each other among the four side portions of the outer package 2 are caused to overlap each other on the top of the battery element 1 so as to sandwich a positive electrode lead 11 and a negative electrode lead 12.

(Heat-Sealing Step)

Figure 5C:
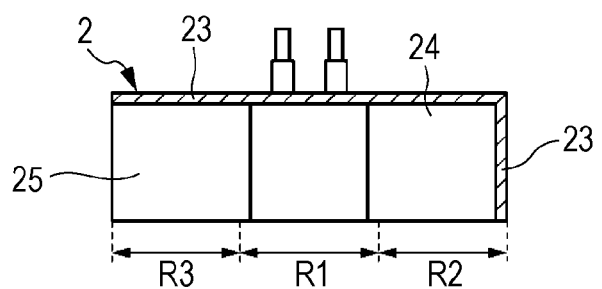

Next, as shown in FIG. 5C, the side portions caused to overlap each other on the top of the battery element 1 are heat-sealed to form a heat-sealed portion 23. Furthermore, a pair of side portions on the second region R2 side among the two pairs of side portions caused to overlap each other on the sides of the battery element 1 are heat-sealed to form a heat-sealed portion 23. Thus, an underpocket portion 24 is formed in the second region R2 of the folded outer package 2, and an opening portion 25 is formed at one end of the folded outer package 2 on the third region R3 side.

(Air Supplying Step)

Figure 5D:
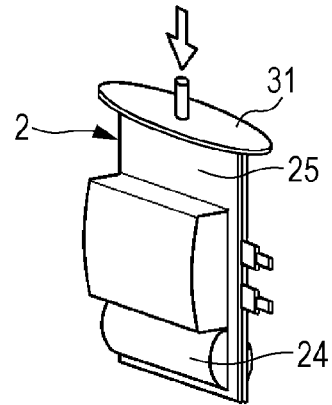

Next, as shown in FIG. 5D, a jig 31 for supplying air is attached to one end of the opening portion 25. Air is then supplied to the underpocket portion 24 from the side of the opening portion 25, which is present at one end of the outer package 2, to expand the underpocket portion 24, which is present at the other end of the outer package 2. Thus, a space for storing the electrolyte composition is formed. This air supplying step is performed, for example, in the atmospheric environment.

(Liquid Injection Step)

Figure 6A:
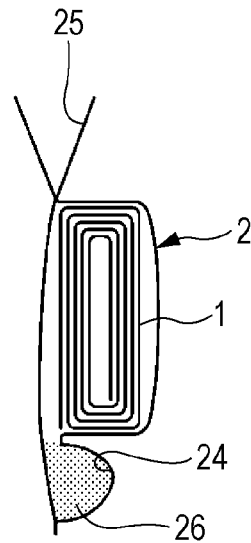
FIGS. 6A to 6C are process diagrams showing an example of the method for producing a battery pack according to the first embodiment.

Next, there is prepared a liquid electrolyte composition containing a solvent, an electrolyte salt, a monomer, which is a raw material of a polymer compound, and a polymerization initiator and optionally other materials such as a polymerization inhibitor. The battery element 1 housed in the outer package 2 is transferred to a vacuum chamber (not shown) and, as shown in FIG. 6A, an electrolyte composition 26 is injected into the space of the underpocket portion 24 from the opening portion 25 in the vacuum chamber. Specifically, the outer package 2 is supported so that the opening portion 25 faces upward. The electrolyte composition 26 is supplied into the outer package 2 from the opening portion 25 using a liquid injection unit such as a nozzle to store the electrolyte composition 26 in the underpocket portion 24.

The battery element 1 and the electrolyte composition 26 stored in the underpocket portion 24 are preferably separated from each other so as not to be in contact with each other. This is because, if the battery element 1 and the electrolyte composition 26 contact each other, the electrolyte composition 26 is forced up by air that comes out of the outer package when a vacuum is formed and is thus scattered, resulting in a decrease in the amount of the electrolyte composition 26. The volume of the underpocket portion 24 is set to be, for example, 1.2 times the volume of the electrolyte composition 26 injected.

(Degassing Step)

Figure 6B:
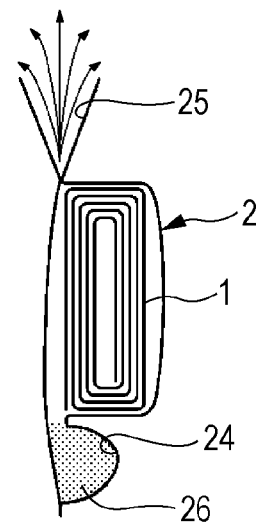

Next, as shown in FIG. 6B, the pressure in the vacuum chamber is reduced to degas the outer package. Thus, the space, battery element 1, and electrolyte composition 26 in the outer package are degassed.

(Heat-Sealing Step)

Figure 6C:
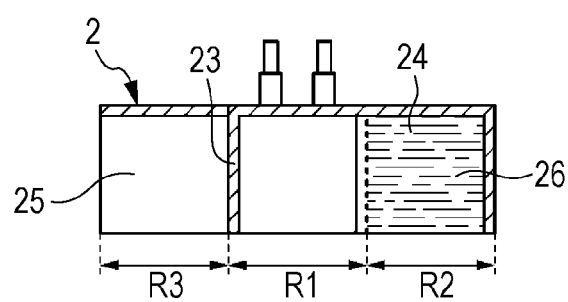

Next, as shown in FIG. 6C, the outer package 2 in the side portion, of the battery element 1, on the opening portion 25 side is heat-sealed while the vacuum state is maintained, to form a heat-sealed portion 23.

(Impregnation Step)

Figure 7A:
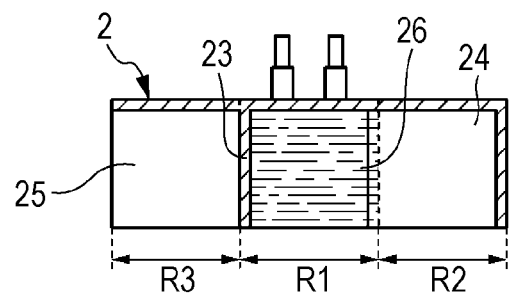
FIGS. 7A to 7C are process diagrams showing an example of the method for producing a battery pack according to the first embodiment.

Next, air is allowed to flow into the vacuum chamber. As shown in FIG. 7A, the underpocket portion 24 is crushed by atmospheric pressure and the electrolyte composition 26 is impregnated into the battery element 1. Since the underpocket portion 24 is only expanded using air, the underpocket portion 24 can be crushed by atmospheric pressure without causing distortion as long as the outer package 2 such as an aluminum laminate film is not subjected to plastic deformation. The underpocket portion 24 may be optionally pressurized in order to facilitate the impregnation of the electrolyte composition 26 into the battery element 1. This can shorten the impregnation time.

Since the impregnation of the electrolyte composition 26 into the battery element is not completed immediately after the vacuum sealing, the battery element 1 may be temporarily stored on a tray or the like until the impregnation is completed. This increases the lead time, but can reduce the cost of equipment compared with before.

(Heat-Pressing Step)

Next, when the battery element 1 impregnated with the electrolyte composition 26 is heat-pressed (heated and pressurized), a monomer contained in the electrolyte composition 26 is polymerized and thus a gel electrolyte layer 16 is formed. At the same time, the positive electrode 13, the negative electrode 14, and the separator 15 constituting the battery element 1 are integrated.

(Sealing Step)

Figure 7B:
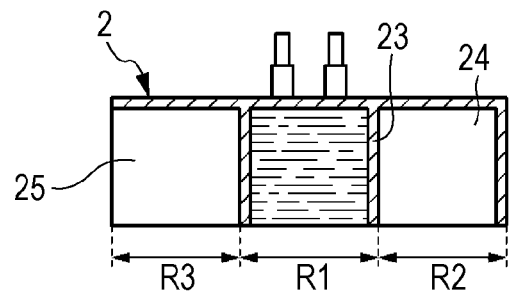

Next, as shown in FIG. 7B, the outer package 2 in the side portion, of the battery element 1, on the underpocket portion 24 side is heat-sealed to form a heat-sealed portion 23. Thus, the battery element 1 is sealed with the outer package 2.

(Cutting Step)

Figure 7C:
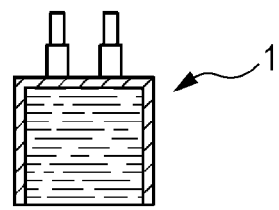

Next, as shown in FIG. 7C, an unnecessary underpocket portion 24 and opening portion 25 are cut out so that the heat-sealed portion 23 formed on both sides of the battery element 1 is left.

Through the steps above, an intended battery pack is obtained.

In the method for producing a battery pack, the order of the steps is not particularly limited. For example, the sealing step is performed after the heat-pressing step, but the order of these two steps is freely selected, that is, the heat-pressing step may be performed after the sealing step.

Figure 8:
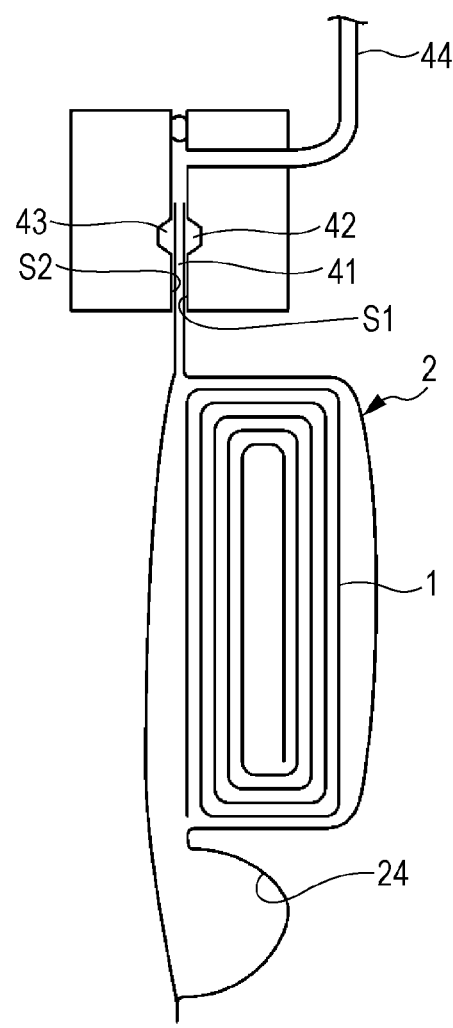
FIG. 8 is a schematic sectional view showing an exemplary structure of an air supplying unit.

FIG. 8 is a schematic sectional view showing an example of the structure of the jig for supplying air to the underpocket portion. The jig, which is an air supplying unit, has a first surface 51 and a second surface S2 disposed so as to face each other with a certain distance therebetween. These surfaces form a housing space 41 for housing one end, of the outer package 2, on the opening portion side. The first surface 51 and second surface S2 respectively have supporting members 42 and 43 such as vacuum suction members. The opening portion 25 of the outer package 2 is opened by the supporting members 42 and 43, and the one end of the outer package 2 is supported while the opening portion 25 is opened. An air introducing pipe 44 is inserted into the housing space 41. Air introduced from the air introducing pipe 44 is supplied to the underpocket portion 24 through the opening portion 25 of the outer package 2. After the underpocket portion 24 is expanded, a closed state is preferably maintained. This can prevent contamination caused by swirling of air.

Modification

In the first embodiment, the case where the gel electrolyte is used as an electrolyte has been described, but an electrolytic solution, which is a liquid electrolyte, may be used as an electrolyte. A battery pack including such an electrolyte can be produced by injecting an electrolytic solution instead of the electrolyte composition 26 to store the electrolytic solution in the space of the underpocket portion 24 in the liquid injection step. When the electrolytic solution is used as an electrolyte, the heat-pressing step of polymerizing the electrolyte composition 26, which is a precursor of the gel electrolyte layer 16, can be omitted.

In the first embodiment, the case where a single outer package 2 is folded back to seal the battery element 1 has been described, but, to seal the battery element 1, two outer packages 2 may be caused to overlap each other so that the surfaces on the heat-sealing layer side face each other. In this case, one of the outer packages 2 may be composed of a hard material such as a hard laminate film and the other of the outer packages 2 may be composed of a soft material such as a soft laminate film. In this case, the outer package 2 composed of a soft laminate film may be expanded through the supply of air to form the space of the underpocket portion 24. The underpocket portion 24 and the opening portion 25 may be left without being cut out. In such a configuration, the underpocket portion 24 and the opening portion 25 may be folded back and pasted onto the upper surface (protruding surface) of the housing space 21.

According to the first embodiment, since the outer package is degassed while a liquid pool of the electrolyte composition 26 or the electrolytic solution is formed below the battery element 1, the scattering of the electrolyte composition 26 or the electrolytic solution during the degassing of the outer package can be suppressed. Furthermore, there can be achieved vacuum sealing immediately after the liquid injection in a highly efficiently degassed state.

Vacuum sealing of the electrolyte composition 26 or the electrolytic solution immediately after liquid injection, which has been difficult to perform, can be performed. By injecting the electrolyte composition 26 or the electrolytic solution into the underpocket portion 24, the liquid level of the electrolyte composition 26 or the electrolytic solution can be set below the battery element 1. Therefore, the liquid level of the electrolyte composition 26 or the electrolytic solution can be prevented from increasing, which can suppress a decrease in the liquid amount. Furthermore, the degassing efficiency in the outer package can be improved.

The amount of the electrolyte composition 26 or the electrolytic solution left in the underpocket portion 24 after the impregnation into the battery element 1 can be decreased. Since the outer package 2 whose inside is in a vacuum state is sealed and then the electrolyte composition 26 or the electrolytic solution is impregnated into the battery element 1, the impregnation time can be shortened using atmospheric pressure. Compared with the case where the battery element 1 is sealed with the outer package 2 at atmospheric pressure and then the electrolyte composition 26 or the electrolytic solution is impregnated into the battery element 1, the impregnation time can be shortened, for example, by about 25 to 50%. Since vacuum impregnation or pressure impregnation used in the past is not necessarily performed, the cost of equipment can be reduced and the contamination of equipment caused by scattering of liquid during vacuum impregnation can be reduced.

In methods for producing a battery pack employed in the past, the electrolyte composition 26 or the electrolytic solution has been impregnated into the battery element 1 in an in-line step. Therefore, the equipment and productive capacity have been dependent on the impregnation time. In contrast, in the method for producing a battery pack according to the first embodiment, the electrolyte composition 26 or the electrolytic solution can be impregnated into the battery element 1 in the air. Therefore, the equipment and productive capacity are not dependent on the impregnation time.

The underpocket portion 24 can be formed only by changing the heat-sealed position of the outer package 2. Thus, the underpocket portion 24 can be easily formed with commonly used equipment. By degassing the outer package while the entire battery element housed in the outer package 2 is inserted into a vacuum chamber, the shape of the underpocket portion 24 is not easily changed due to the degassing of the outer package. By transferring the battery element to a pressure chamber after vacuum sealing, the impregnation time of the electrolyte composition 26 or the electrolytic solution into the battery element 1 may be shortened.

Second Embodiment

FIGS. 9A to 10D are process diagrams for describing an example of a method for producing a battery pack according to a second. In the second embodiment, the same parts as or the parts corresponding to those in the first embodiment are denoted by the same reference numerals. The second embodiment differs from the first embodiment in that the underpocket portion 24 is formed on the bottom of the battery element 1.

An example of a method for producing a battery element according to the second embodiment will now be described with reference to FIGS. 9A to 10D.

(Outer Package Preparation Step)

Figure 9A:
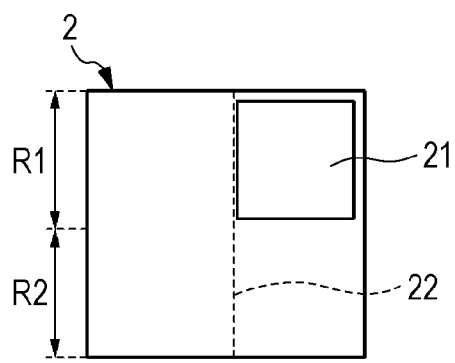
FIGS. 9A to 9D are process diagrams showing an example of a method for producing a battery pack according to a second embodiment.

First, as shown in FIG. 9A, a rectangular outer package 2 is prepared. A folding portion 22 that linearly extends so as to divide the outer package 2 into two parts is formed in advance in the central portion of the outer package 2. The outer package 2 includes a first region R1 and a second region R2 formed so as to be adjacent to one side of the first region R1.

(Housing Space Formation Step)

Next, as shown in FIG. 9A, embossing is performed on a portion located in one of the parts into which the outer package 2 is divided by the folding portion 22, the portion being on a surface on the heat-sealing resin layer side in the first region R1. Thus, a housing space 21 for housing the battery element 1 is formed.

(Element Housing and Outer Package Folding Step)

Figure 9B:
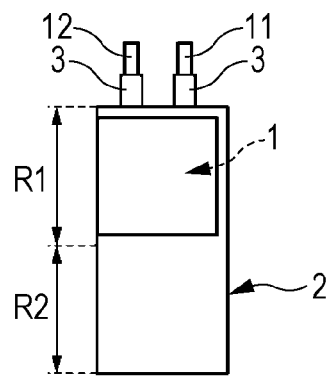

Next, as shown in FIG. 9B, the battery element 1 is housed in the housing space 21 and the outer package 2 is folded back along the folding portion 22. Two side portions facing each other among the four side portions of the outer package 2 are caused to overlap each other on the side of the battery element 1.

(Heat-Sealing Step)

Figure 9C:
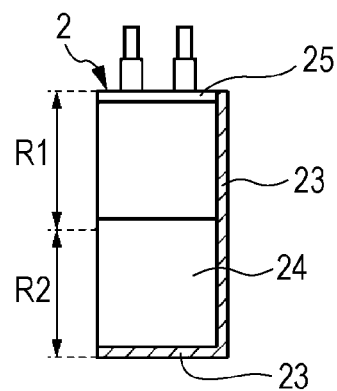

Next, as shown in FIG. 9C, the side portions caused to overlap each other on the side of the battery element 1 are heat-sealed to form a heat-sealed portion 23. Furthermore, the side portions caused to overlap each other on the bottom of the battery element 1 are heat-sealed to form a heat-sealed portion 23. Thus, an opening portion 25 is formed on the top of the battery element 1.

(Air Supplying Step)

Figure 9D:
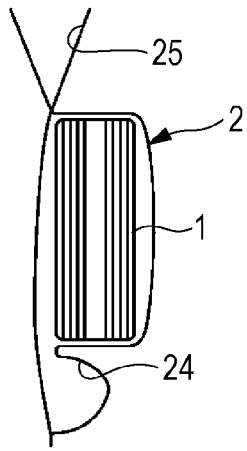

Next, as shown in FIG. 9D, a jig (not shown) for supplying air is attached to one end of the opening portion 25. Air is then supplied to an underpocket portion 24 from the side of the opening portion 25 to expand the underpocket portion 24. Thus, a space for storing an electrolyte composition 26 is formed.

(Liquid Injection Step)

Figure 10A:
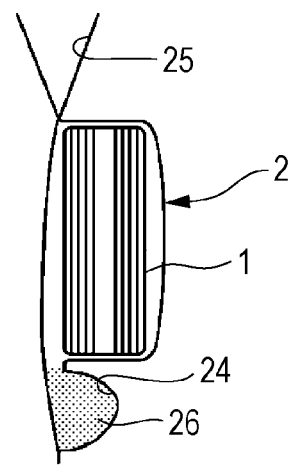
FIGS. 10A to 10D are process diagrams showing an example of the method for producing a battery pack according to the second embodiment.

Next, the battery element 1 housed in the outer package 2 is transferred to a vacuum chamber (not shown) and, as shown in FIG. 10A, an electrolyte composition 26 is injected into the space of the underpocket portion 24 through the opening portion 25 in the vacuum chamber. Specifically, the outer package 2 is supported so that the opening portion 25 faces upward. The electrolyte composition 26 is supplied into the outer package 2 through the opening portion 25 using a liquid injection unit such as a nozzle to store the electrolyte composition 26 in the underpocket portion 24.

(Degassing Step)

Next, for example, the pressure in the vacuum chamber is reduced to degas the outer package. Thus, the space, battery element 1, and electrolyte composition 26 in the outer package are degassed.

(Heat-Sealing Step)

Figure 10B:
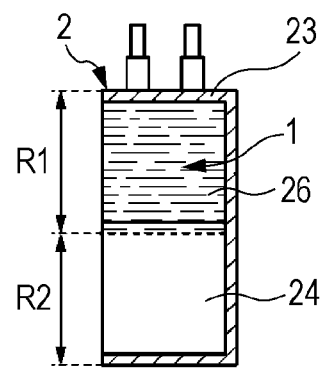

Next, as shown in FIG. 10B, the outer package 2 in the top portion of the battery element 1 is heat-sealed while the vacuum state is maintained, to form a heat-sealed portion 23.

(Impregnation Step)

Next, air is allowed to flow into the vacuum chamber. The underpocket portion 24 is crushed by atmospheric pressure and the electrolyte composition 26 is impregnated into the battery element 1. The underpocket portion 24 may be optionally pressurized in order to facilitate the impregnation of the electrolyte composition 26 into the battery element 1. This can shorten the impregnation time.

(Heat-Pressing Step)

Next, when the battery element 1 impregnated with the electrolyte composition 26 is heat-pressed (heated and pressurized), a monomer contained in the electrolyte composition 26 is polymerized and thus a gel electrolyte layer 16 is formed. At the same time, the positive electrode 13, the negative electrode 14, and the separator 15 constituting the battery element 1 are integrated.

(Sealing Step)

Figure 10C:
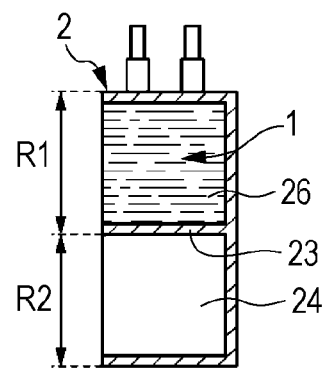

Next, as shown in FIG. 10C, the outer package 2 in a portion, of the battery element 1, on the bottom is heat-sealed to form a heat-sealed portion 23. Thus, the battery element 1 is sealed with the outer package 2.

(Cutting Step)

Figure 10D:
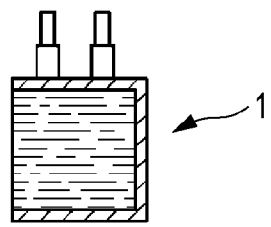

Next, as shown in FIG. 10D, an unnecessary underpocket portion 24 is cut out so that the heat-sealed portion 23 formed on the bottom of the battery element 1 is left.

Through the steps above, an intended battery pack is obtained.

In the second embodiment, the same advantages as those of the first embodiment can be achieved.

EXAMPLES

The present application will now be specifically described based on Examples, but is not limited to only Examples. In Examples and Comparative Examples below, the parts corresponding to those in the above-described embodiments are denoted by the same reference numerals.

Example 1

A method for producing a battery element pack according to Example 1 will now be described with reference to FIGS. 5A to 7C.

(Outer Package Preparation Step)

First, a rectangular aluminum laminate film 2 obtained by laminating a nylon film, an aluminum foil, and a polyethylene film in that order was prepared as an outer package.

(Housing Space Formation Step)

Next, as shown in FIG. 5A, embossing was performed on one of regions obtained by dividing the aluminum laminate film 2 into six parts, the one of the regions being present in the central portion and on a surface on the polyethylene film side. Thus, an embossed portion 21 serving as a housing space was formed.

(Element Housing and Outer Package Folding Step)

Next, as shown in FIG. 5B, a wound battery element 1 was housed in the embossed portion 21 and the aluminum laminate film 2 was folded back along a folding portion 22. Two side portions of the aluminum laminate film 2 facing each other were caused to overlap each other on the top of the battery element 1 so as to sandwich a positive electrode lead 11 and a negative electrode lead 12.

(Heat-Sealing Step)

Next, as shown in FIG. 5C, the side portions caused to overlap each other on the top of the battery element 1 were heat-sealed to form a heat-sealed portion 23. At the same time, a pair of side portions on the second region R2 side among two pairs of side portions caused to overlap each other on the sides of the battery element 1 were heat-sealed to form a heat-sealed portion 23. Thus, an underpocket portion 24 was formed in the second region R2 of the folded aluminum laminate film 2, and an opening portion 25 was formed at one end of the folded aluminum laminate film 2 on the third region R3 side.

(Air Supplying Step)

Next, as shown in FIG. 5D, a jig 31 for supplying air was attached to one end of the opening portion 25. Air was then supplied to the underpocket portion 24 from the side of the opening portion 25 to expand the underpocket portion 24. Thus, a space for storing an electrolytic solution 26 was formed.

(Liquid Injection Step)

Next, as shown in FIG. 6A, the battery element 1 housed in the aluminum laminate film 2 was transferred to a vacuum chamber, and the aluminum laminate film 2 was supported in the vacuum chamber so that the opening portion 25 faced upward. An electrolytic solution 26 was then supplied into the aluminum laminate film through the opening portion 25 using a nozzle to store the electrolytic solution 26 in the underpocket portion 24. The electrolytic solution was injected in an amount of 1830 mg.

(Degassing Step)

Next, as shown in FIG. 6B, the pressure in the vacuum chamber was reduced to degas the space, battery element 1, and electrolytic solution 26 in the aluminum laminate film.

(Heat-Sealing Step)

Next, as shown in FIG. 6C, the aluminum laminate film 2 in the side portion, of the battery element 1, on the opening portion 25 side was heat-sealed while the vacuum state was maintained, to form a heat-sealed portion 23.

(Impregnation Step)

Next, air was allowed to flow into the vacuum chamber. As shown in FIG. 7A, the underpocket portion 24 was crushed by atmospheric pressure and the electrolytic solution 26 was impregnated into the battery element 1.

(Sealing Step)

Next, as shown in FIG. 7B, the aluminum laminate film 2 in the side portion, of the battery element 1, on the underpocket portion 24 side was heat-sealed to form a heat-sealed portion 23. Thus, the battery element 1 was sealed with the aluminum laminate film 2.

(Cutting Step)

Next, as shown in FIG. 7C, an unnecessary underpocket portion 24 and opening portion 25 are cut out so that the heat-sealed portion 23 formed on both sides of an element housing portion 1 was left.

Through the steps above, an intended battery pack was obtained.

Comparative Example 1

A battery pack was produced by the same method as in Example 1, except that a space with a depth of 2.5 mm was formed in the underpocket portion 24 by deep drawing without forming a space by expanding the underpocket portion 24 through the supply of air.

Comparative Example 2

A method for producing a battery element pack according to comparative Example 2 will now be described with reference to FIGS. 11A to 12B.

(Outer Package Preparation Step)

First, a rectangular aluminum laminate film 2 obtained by laminating a nylon film, an aluminum foil, and a polyethylene film in that order was prepared as an outer package.

(Housing Space Formation Step)

Figure 11A:
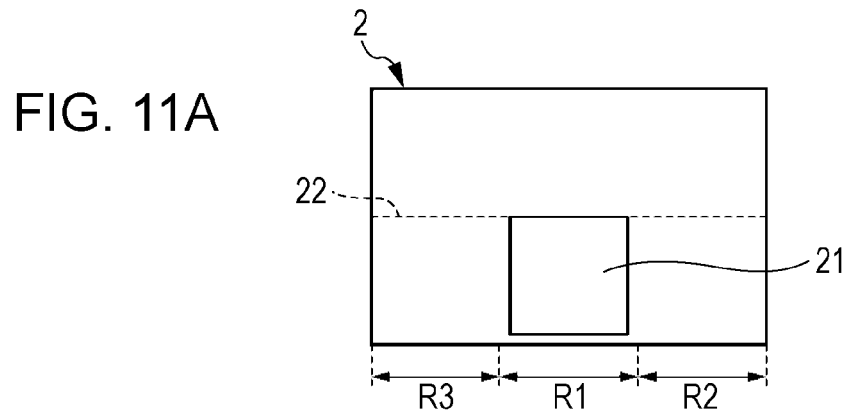
FIGS. 11A to 11D are process diagrams showing a method for producing a battery pack according to Comparative Example 2.

Next, as shown in FIG. 11A, embossing was performed on one of regions obtained by dividing the aluminum laminate film 2 into six parts, the one of the regions being present in the central portion and on a surface on the polyethylene film side. Thus, an embossed portion 21 serving as a housing space was formed.

(Element Housing and Outer Package Folding Step)

Figure 11B:
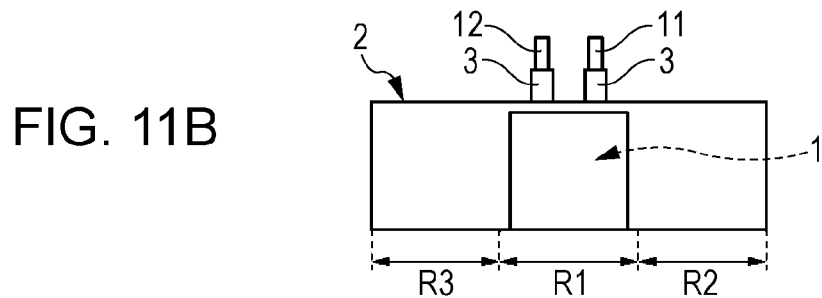

Next, as shown in FIG. 11B, a wound battery element 1 was housed in the embossed portion 21 and the aluminum laminate film 2 was folded back along a folding portion. Two side portions of the aluminum laminate film 2 facing each other were caused to overlap each other on the top of the battery element 1 so as to sandwich a positive electrode lead 11 and a negative electrode lead 12.

(Heat-Sealing Step)

Figure 11C:
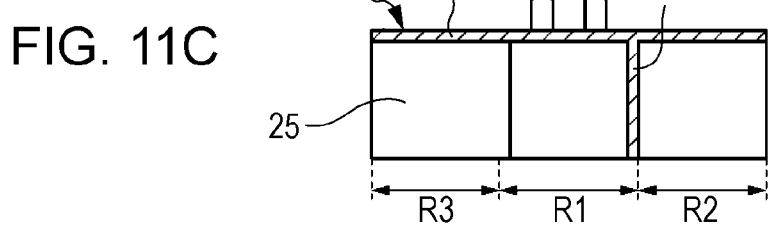

Next, as shown in FIG. 11C, the side portions caused to overlap each other on the top of the battery element 1 were heat-sealed to form a heat-sealed portion 23. At the same time, the aluminum laminate film 2 in a side portion, of the battery element 1, on the second region R2 side was heat-sealed to form a heat-sealed portion 23. Thus, an opening portion 25 was formed at one end of the folded aluminum laminate film 2 on the third region R3 side.

(Liquid Injection Step)

Figure 11D:
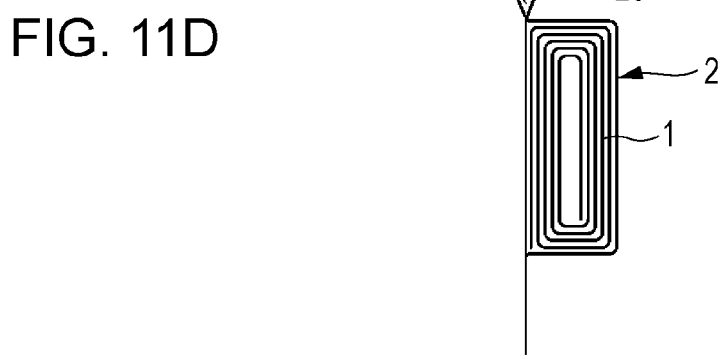

Next, as shown in FIG. 11D, the battery element 1 housed in the aluminum laminate film 2 was transferred to a vacuum chamber, and the aluminum laminate film 2 was supported in the vacuum chamber so that the opening portion 25 faced upward. An electrolytic solution 26 was then supplied to the opening portion 25 using a nozzle to store the electrolytic solution 26 above the battery element 1. The electrolytic solution was injected in an amount of 1830 mg.

(Degassing Step and Impregnation Step)

Next, as shown in FIG. 11D, the pressure in the vacuum chamber was reduced to degas the space, battery element 1, and electrolytic solution 26 in the aluminum laminate film. At the same time, the electrolytic solution 26 stored in the opening portion 25 was impregnated into the battery element 1. In this process, the whole electrolytic solution 26 could not be impregnated into the battery element 1, and part of the electrolytic solution 26 was left in the opening portion 25.

(Sealing Step)

Figure 12A:
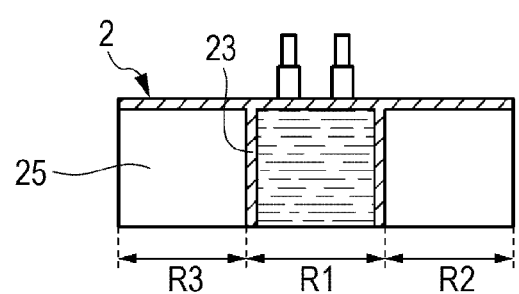
FIGS. 12A and 12B are process diagrams showing the method for producing a battery pack according to Comparative Example 2.

Next, as shown in FIG. 12A, the aluminum laminate film 2 in the side portion, of the battery element 1, on the third region R3 side was heat-sealed to form a heat-sealed portion 23. Thus, the battery element 1 was sealed with the aluminum laminate film 2.

(Cutting Step)

Figure 12B:
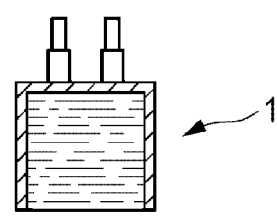

Next, as shown in FIG. 12B, an unnecessary aluminum laminate film 2 in the first region R1 and second region R2 was cut out so that the heat-sealed portion 23 formed on both sides of the battery element 1 was left.

Through the steps above, an intended battery pack was obtained.

(Amount of Electrolytic Solution Reduction and Percentage of Electrolytic Solution Reduction)

Regarding the electrolytic solutions contained in the battery packs of Example 1 and Comparative Examples 1 and 2, the amount of electrolytic solution reduction and the percentage of electrolytic solution reduction were determined as follows.

First, the amount of electrolytic solution injection was determined using the following formula (6).

$$\text{Amount of electrolytic solution injection} = (\text{Mass of battery pack after electrolytic solution injection}) - (\text{Mass of battery pack before electrolytic solution injection})[g] \quad (6)$$

Regarding five battery packs for each of Example 1 and Comparative Examples 1 and 2, the amount of electrolytic solution reduction between before and after the degassing step was determined using the following formula (7). The amounts of electrolytic solution reduction were simply averaged (arithmetic mean) to determine the average of the amounts of electrolytic solution reduction.

$$\text{Amount of electrolytic solution reduction} = (\text{Mass of battery pack before degassing step}) - (\text{Mass of battery pack after degassing step (after vacuum sealing)})[g] \quad (7)$$

Subsequently, the amount of electrolytic solution injection and the average of the amounts of electrolytic solution reduction were substituted into the following formula (8) to determine the percentage of electrolytic solution reduction between before and after the degassing step.

$$\text{Percentage of electrolytic solution reduction} = (\text{Average of amounts of electrolytic solution reduction} / \text{Amount of electrolytic solution injection}) \times 100 \, [\%] \quad (8)$$

(Amount of Electrolytic Solution Left)

Regarding the electrolytic solutions contained in the battery packs of Example 1 and Comparative Example 1, the amount of electrolytic solution left was determined as follows. The mass (hereinafter referred to as "mass of film before removal of electrolytic solution") of the aluminum laminate film of the underpocket portion cut out in the above-described cutting step was measured. Subsequently, the sealed portion of the aluminum laminate film was opened, the electrolytic solution was completely wiped out, and the aluminum laminate film was dried. The mass (hereinafter referred to as "mass of film after removal of electrolytic solution") of the aluminum laminate film was measured again. These measured values were substituted into the following formula (9) to determine the amount of electrolytic solution left.

$$\text{Amount of electrolytic solution left} = (\text{Mass of film before removal of electrolytic solution}) - (\text{Mass of film after removal of electrolytic solution}) \quad (9)$$

Regarding five battery packs for each of Example 1 and Comparative Examples 1, the amount of electrolytic solution left was determined. The amounts of electrolytic solutions left were simply averaged (arithmetic mean) to determine the average of the amounts of electrolytic solutions left.

Table shows the evaluation results of the battery packs in Example 1 and Comparative Examples 1 and 2.

TABLE 1

| | Underpocket portion | Method for forming space of underpocket portion | Amount of electrolytic solution injection [mg] | Average of amounts of electrolytic solution reduction [mg] | Percentage of electrolytic solution reduction [%] | Average of amounts of electrolytic solutions left [mg] |
|---|---|---|---|---|---|---|
| Example 1 | presence | Expansion with air | 1830 | 4.325 | 0.236 | 1.7 |

TABLE 1-continued

|  | Underpocket portion | Method for forming space of underpocket portion | Amount of electrolytic solution injection [mg] | Average of amounts of electrolytic solution reduction [mg] | Percentage of electrolytic solution reduction [%] | Average of amounts of electrolytic solutions left [mg] |
|---|---|---|---|---|---|---|
| Comparative Example 1 | presence | Deep drawing | 1830 | 7 | 0.383 | 21.5 |
| Comparative Example 2 | absence | — | 1830 | 500 | 27.32 | — |

The following is understood from Table.

In Example 1 and Comparative Example 1 in which the underpocket portion is used, the percentage of electrolytic solution reduction can be decreased compared with Comparative Example 2 in which the underpocket portion is not used. This is because, in Example 1 and Comparative Example 1, the scattering of the electrolytic solution in the degassing step and the overflow of the electrolytic solution in the sealing step are suppressed compared with Comparative Example 2.

In Example 1 in which the space of the underpocket portion is formed through the supply of air, a variation in the amount of electrolytic solution left can be decreased compared with Comparative Example 1 in which the space of the underpocket portion is formed by deep drawing. This is probably because, when the aluminum laminate film is subjected to plastic deformation, it is difficult to impregnate a stable amount of electrolytic solution into the battery element using only atmospheric pressure.

The embodiments have been specifically described above, but the present application is not limited to the embodiments described above and various modifications can be made on the basis of the technical idea.

For example, the configurations, methods, shapes, materials, numerical values, and the like described in the above embodiments are mere examples, and other different configurations, methods, shapes, materials, numerical values, and the like may be optionally used.

The configurations of the above-described embodiments can be combined with each other without departing from the spirit.

In the above-described embodiments, the case where the electrolyte composition or the electrolytic solution is impregnated into the battery element has been described, but the present application is not limited to the case. For example, the present application can be applied to the case where a highly volatile liquid or the like is impregnated into an object having a large number of pores with high precision. For example, an underpocket is formed at one end of a container such as a pack and an opening portion is formed at the other end. The vacuuming is performed from the opening portion formed at the other end to vacuum-pack the container, whereby a highly volatile liquid can be impregnated into an object having a large number of pores with high precision. Since a liquid is impregnated into an object in such a manner, the entire object is not necessarily immersed in a liquid and the impregnation can be performed in a minimum amount of liquid. The vacuum packing can provide impregnation that uses atmospheric pressure, and the complete impregnation of liquid (no remaining liquid) can be possibly achieved. A film-like container that deforms and crushes at atmospheric pressure is preferably used as the container such as a pack. This is because a space with a volume equivalent to the volume of liquid impregnated into the object is crushed by atmospheric pressure and thus the impregnation of liquid is facilitated.

In the above-described embodiments, the case where the present application is applied to lithium ion secondary batteries has been described, but the present application is not limited to the case. The present application can be applied to various secondary batteries and primary batteries having a structure in which a battery element is sealed with an outer package.

In the above-described embodiments, the case where the present application is applied to the battery element having a wound structure has been described, but the structure of battery elements is not limited thereto. The present application can be applied to battery elements having a structure in which a positive electrode and a negative electrode are folded up or a structure in which a positive electrode and a negative electrode are stacked.

In the above-described embodiments, the case where a flat battery element is used has been described, but the shape of the battery element is not limited thereto. Various commonly used shapes such as a square shape and a cylindrical shape can be used for battery elements.

In the above-described embodiments, the case where the underpocket portion is expanded using air has been described, but the underpocket portion may be expanded using gas other than air. Preferable examples of the gas other than air include stable gases with low reactivity such as inert gases, e.g., helium and argon.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A method for producing a battery comprising:
    forming a space by expanding a liquid housing portion, the liquid housing portion being present at one end of an outer package that houses a battery element, through supply of gas from an opening portion formed at the other end of the outer package, wherein the opening portion, the battery element, and the liquid housing portion collectively define a longitudinal axis;
    folding the outer package along a folding portion extending substantially parallel to the longitudinal axis and spaced away from positive and negative electrode leads, thereby sandwiching the positive and negative electrode leads;
    injecting an electrolytic solution from the opening portion to store the electrolytic solution in the space of the liquid housing portion;
    degassing the outer package through the opening portion in a vacuum state;

sealing the opening portion; and impregnating the electrolytic solution into the battery element.

2. A method for producing a battery comprising:

forming a space by expanding a liquid housing portion, the liquid housing portion being present at one end of an outer package that houses a battery element, through supply of gas from an opening portion formed at the other end of the outer package, wherein the opening portion, the battery element, and the liquid housing portion collectively define a longitudinal axis;

folding the outer package along a folding portion extending substantially parallel to the longitudinal axis and spaced away from positive and negative electrode leads, thereby sandwiching the positive and negative electrode leads;

injecting an electrolyte composition from the opening portion to store the electrolyte composition in the space of the liquid housing portion;

degassing the outer package through the opening portion in a vacuum state;

sealing the opening portion;

impregnating the electrolyte composition into the battery element; and gelatinizing the electrolyte composition impregnated into the battery element.

3. The method according to claim 1, wherein the opening portion is sealed while the vacuum state is maintained.

4. The method according to claim 1, wherein the electrolytic solution is impregnated into the battery element using atmospheric pressure.

5. The method according to claim 2, wherein the electrolyte composition is impregnated into the battery element using atmospheric pressure.

6. The method according to claim 1, wherein the outer package is an aluminum laminate film.

7. The method according to claim 1, further comprising, after the impregnation of the electrolytic solution into the battery element:

sealing a portion between the liquid housing portion and a housing portion of the battery element; and removing the liquid housing portion.

8. The method according to claim 1, wherein the outer package is composed of a soft film and a hard film, the battery element is housed between the soft film and the hard film, and in the formation of the space, the space is formed by expanding the soft film.

9. The method according to claim 1, wherein the electrolytic solution is impregnated into the battery element by pressurizing the space in which the electrolytic solution is stored.

10. The method according to claim 2, wherein the electrolyte composition is impregnated into the battery element by pressurizing the space in which the electrolyte composition is stored.

11. A battery comprising:

a battery element containing an electrolytic solution; and an outer package that seals and houses the battery element, the outer package including a folding portion spaced away from positive and negative electrode leads, wherein the battery element is obtained by (1) forming a space by expanding a liquid housing portion, the liquid housing portion being present at one end of the outer package, through supply of gas from an opening portion formed at the other end of the outer package, wherein the opening portion, the battery element, and the liquid hosing portion collectively define a longitudinal axis, (2) folding the outer package along the folding portion extending substantially parallel to the longitudinal axis, thereby sandwiching the positive and negative electrode leads, (3) injecting an electrolytic solution from the opening portion to store the electrolytic solution in the space of the liquid housing portion, (4) degassing the outer package through the opening portion in a vacuum state, (5) sealing the opening portion, and (6) impregnating the electrolytic solution into the battery element.

12. A battery comprising:

a battery element containing a gel electrolyte; and an outer package that seals and houses the battery element, the outer package including a folding portion spaced away from positive and negative electrode leads, wherein the battery element is obtained by (1) forming a space by expanding a liquid housing portion, the liquid housing portion being present at one end of the outer package, through supply of gas from an opening portion formed at the other end of the outer package, wherein the opening portion, the battery element, and the liquid housing portion collectively define a longitudinal axis, (2) folding the outer package along the folding portion extending substantially parallel to the longitudinal axis, thereby sandwiching the positive and negative electrode leads, (3) injecting an electrolyte composition from the opening portion to store the electrolyte composition in the space of the liquid housing portion, (4) degassing the outer package through the opening portion in a vacuum state, (5) sealing the opening portion, (6) impregnating the electrolyte composition into the battery element, and (7) gelatinizing the electrolyte composition impregnated into the battery element.

* * * * *